United States Patent
Wu et al.

(10) Patent No.: US 10,184,659 B2
(45) Date of Patent: Jan. 22, 2019

(54) LOW-NOX COMBUSTION METHOD

(71) Applicants: Kuang-Tsai Wu, East Amherst, NY (US); Hisashi Kobayashi, Bedford, NY (US)

(72) Inventors: Kuang-Tsai Wu, East Amherst, NY (US); Hisashi Kobayashi, Bedford, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 361 days.

(21) Appl. No.: 15/094,044

(22) Filed: Apr. 8, 2016

(65) Prior Publication Data

US 2016/0305656 A1    Oct. 20, 2016

Related U.S. Application Data

(60) Provisional application No. 62/147,786, filed on Apr. 15, 2015.

(51) Int. Cl.
*F23J 15/02* (2006.01)
*C01B 3/32* (2006.01)
(Continued)

(52) U.S. Cl.
CPC ............. *F23J 15/022* (2013.01); *C01B 3/32* (2013.01); *C03B 5/235* (2013.01); *C03B 5/237* (2013.01); *C03B 5/2353* (2013.01); *F23C 6/047* (2013.01); *F23C 9/00* (2013.01); *F23G 7/066* (2013.01); *F23J 15/06* (2013.01); *F23L 7/007* (2013.01); *F23L 15/02* (2013.01); *F23C 2202/20* (2013.01); *F23L 2900/07007* (2013.01); *Y02E 20/322* (2013.01); *Y02E 20/344* (2013.01); *Y02E 20/348* (2013.01); *Y02P 40/535* (2015.11); *Y02P 40/55* (2015.11)

(58) Field of Classification Search
CPC .... C01B 3/32; F23C 6/047; F23C 9/00; F23C 2202/20; F23G 7/066; F23J 15/022; F23J 15/06; C03B 5/235; C03B 5/2353; C03B 5/237; Y02P 40/55; Y02P 40/535; F23L 2900/07007; F23L 15/02; F23L 7/007; Y02E 20/322; Y02E 20/344; Y02E 20/348

See application file for complete search history.

(56) References Cited

U.S. PATENT DOCUMENTS 4,347,072 A   8/1982   Nagaoka
5,076,779 A   12/1991  Kobayashi
(Continued)

FOREIGN PATENT DOCUMENTS

EP   0928938   7/1999
EP   0953543   11/1999

OTHER PUBLICATIONS

Furusawa, et al. "Nitric Oxide Reduction by Hydrogen and Carbon Monoxide over Char Surface", ACS symposium Series, vol. 196, (Sep. 1982) pp. 347-357.

(Continued)

*Primary Examiner* — Alfred Basichas
(74) *Attorney, Agent, or Firm* — Donald T. Black

(57) ABSTRACT

Disclosed is a combustion method in which heated flue gas heats a regenerator through which a mixture of fuel and flue gas containing NOx is passed to undergo endothermic reactions that produce syngas and destroy NOx.

12 Claims, 3 Drawing Sheets

(51) Int. Cl.

| | |
|---|---|
| *F23L 7/00* | (2006.01) |
| *F23L 15/02* | (2006.01) |
| *F23C 6/04* | (2006.01) |
| *F23C 9/00* | (2006.01) |
| *F23G 7/06* | (2006.01) |
| *F23J 15/06* | (2006.01) |
| *C03B 5/235* | (2006.01) |
| *C03B 5/237* | (2006.01) |

(56) References Cited

U.S. PATENT DOCUMENTS

| | | |
|---|---|---|
| 5,139,755 A | 8/1992 | Seeker |
| 5,759,022 A | 6/1998 | Koppang |
| 5,851,256 A | 12/1998 | Quirk et al. |
| 5,993,203 A | 11/1999 | Koppang |
| 6,113,874 A | 9/2000 | Kobayashi |
| 6,488,076 B1 * | 12/2002 | Yasuda .................. F23G 7/065 165/10 |
| 2002/0076668 A1 | 6/2002 | Venizelos et al. |

OTHER PUBLICATIONS

Shulver, Ian "Pilkington 3R Process: A Refractory Perspective," The American Society Bulletin, www.ceramicbulletin.org (May 1999) pp. 59-63.

Wu, K.T. et.al. "Development and Application of a Gas Reburning Process Model for the Design of Boiler NOx Reductions," ASME 91-JPGC-FACT-24, (Oct. 1991) 8 pages.

\* cited by examiner

LOW-NOX COMBUSTION METHOD

CROSS REFERENCE TO RELATED APPLICATIONS

This application claims the benefit of priority to U.S. provisional application Ser. No. 62/147,786 filed on Apr. 15, 2015, the disclosure of which is incorporated by reference herein in its entirety.

FIELD OF THE INVENTION

The present invention relates to combustion in furnaces such as glassmelting furnaces wherein material is fed into the furnace and is heated and/or melted by the heat of combustion that occurs within the furnace.

BACKGROUND OF THE INVENTION

Reducing NOx emissions has been a common environmental goal for many industries which use hydrocarbon fuels as a means of supplying heat and energy for various process needs. Typically a hydrocarbon fuel is combusted with an oxidant to release the fuel's chemical energy, as such single or multiple high temperature flames are also formed. Heat from the flame is transferred to process loads for a variety of purposes, such as to produce high pressure steam for electricity generation or to melt raw materials for making glasses and metals. The flame combustion process generates high temperature flue gas streams which contain major combustion species such as $CO_2$ and $H_2O$, as well as undesirable emissions such as $SO_2$ and NOx (by which is meant NO, $NO_2$, $N_2O$, and any combination of two or all three of them). Normally, NOx in the flue gases of hydrocarbon combustion contains NO.

A number of technologies have been developed to reduce NOx emissions. These technologies include fuel staging, oxidant staging, reburning, oxy-fuel combustion, specially designed low NOx burners, selective non-catalytic reduction (SNCR), selective catalytic reduction (SCR), and flue gas scrubbing. Selecting a NOx reduction technology for commercial needs among many other factors, depends on the level of NOx to be reduced and its associated costs. Occasionally, plant space available to install the NOx reduction equipment also becomes a factor to consider in decision making. Furthermore, different types of NOx reduction technologies may be combined to reach targeted NOx emission levels.

In regenerative glass melting furnaces firing natural gas with high temperature preheated combustion air, the flame temperature becomes very high, which causes high NOx emissions. One way to reduce the NOx emission is to reduce the flame temperature by reducing the combustion air preheat temperature. Such a method, however, reduces the amount of heat recovered from the furnace flue gas.

If there is no additional heat recovery device downstream of the regenerator flue duct, the higher temperature flue gas then exhausts into the stack and imposes a fuel penalty and thus higher operating costs. Since flue gas exiting from the system has high temperature, it becomes important to make sure that downstream flue duct refractory and pollution control equipment can operate in these higher temperature regimes. There is a need to reduce NOx emissions from high temperature furnaces without reducing heat recovery efficiency.

BRIEF SUMMARY OF THE INVENTION

One aspect of the present invention is a method of carrying out combustion in a furnace, comprising (A) combusting fuel in a furnace to produce gaseous combustion products comprising NOx, and (B) alternately (1) passing gaseous combustion products comprising NOx from the furnace into and through a cooled first regenerator to heat the first regenerator and cool said gaseous combustion products, and passing a first part of said cooled gaseous combustion products from said first regenerator, and fuel, into a heated second regenerator and, in the second regenerator, reacting the gaseous combustion products and the fuel in an endothermic reaction to reduce NOx in said gaseous combustion products to nitrogen and to form syngas comprising hydrogen, CO, and said nitrogen, and passing said syngas from the second regenerator into the furnace and combusting it in the furnace, while passing the remainder of said gaseous combustion products from said first regenerator to exhaust (as defined herein), and (2) passing gaseous combustion products comprising NOx from the furnace into and through a cooled second regenerator to heat the second regenerator and cool said gaseous combustion products, and passing a first part of said cooled gaseous combustion products from said second regenerator, and fuel, into a heated first regenerator and, in the first regenerator, reacting the gaseous combustion products and the fuel in an endothermic reaction to reduce NOx in said gaseous combustion products to nitrogen and to form syngas comprising hydrogen, CO, and said nitrogen, and passing said syngas from the first regenerator into the furnace and combusting it in the furnace, while passing the remainder of said gaseous combustion products from said second regenerator to exhaust (as defined herein).

Another aspect of the present invention comprises a method of carrying out combustion in a furnace, comprising (A) combusting fuel in a furnace to produce gaseous combustion products comprising NOx, and (B) alternately (1) passing gaseous combustion products comprising NOx from the furnace into and through a cooled first regenerator to heat the first regenerator and cool said gaseous combustion products, and passing a first part of said cooled gaseous combustion products from said first regenerator, and fuel, into a heated second regenerator and, in the second regenerator, reacting the gaseous combustion products and the fuel in an endothermic reaction to reduce NOx in said gaseous combustion products to nitrogen and to form syngas comprising hydrogen, CO, and said nitrogen, and passing said syngas from the second regenerator into the furnace and combusting it by staged combustion in the furnace, while entraining said gaseous combustion products comprising NOx in the furnace into the syngas stream entering the furnace from the second regenerator, and reducing NOx in the syngas stream in a fuel-rich zone of the staged combustion, and (2) passing gaseous combustion products comprising NOx from the furnace into and through a cooled second regenerator to heat the second regenerator and cool said gaseous combustion products, and passing a first part of said cooled gaseous combustion products from said second regenerator, and fuel, into a heated first regenerator and, in the first regenerator, reacting the gaseous combustion products and the fuel in an endothermic reaction to reduce NOx in said gaseous combustion products to nitrogen and to form syngas comprising hydrogen, CO, and said nitrogen, and passing said syngas from the first regenerator into the furnace and combusting it by staged combustion in the furnace, while entraining said gaseous combustion products comprising NOx in the furnace into the syngas stream entering the furnace from the first regenerator, and reducing NOx in the syngas stream in a fuel-rich zone of the staged combustion.

Preferably, the flue gas that is passed to exhaust (as defined herein) contains less NOx than the total amount of the flue gas that would be produced by operating the furnace under the same conditions except without passing said first part of flue gas and fuel from either regenerator into the other regenerator.

DETAILED DESCRIPTION OF THE INVENTION

Figure 1:
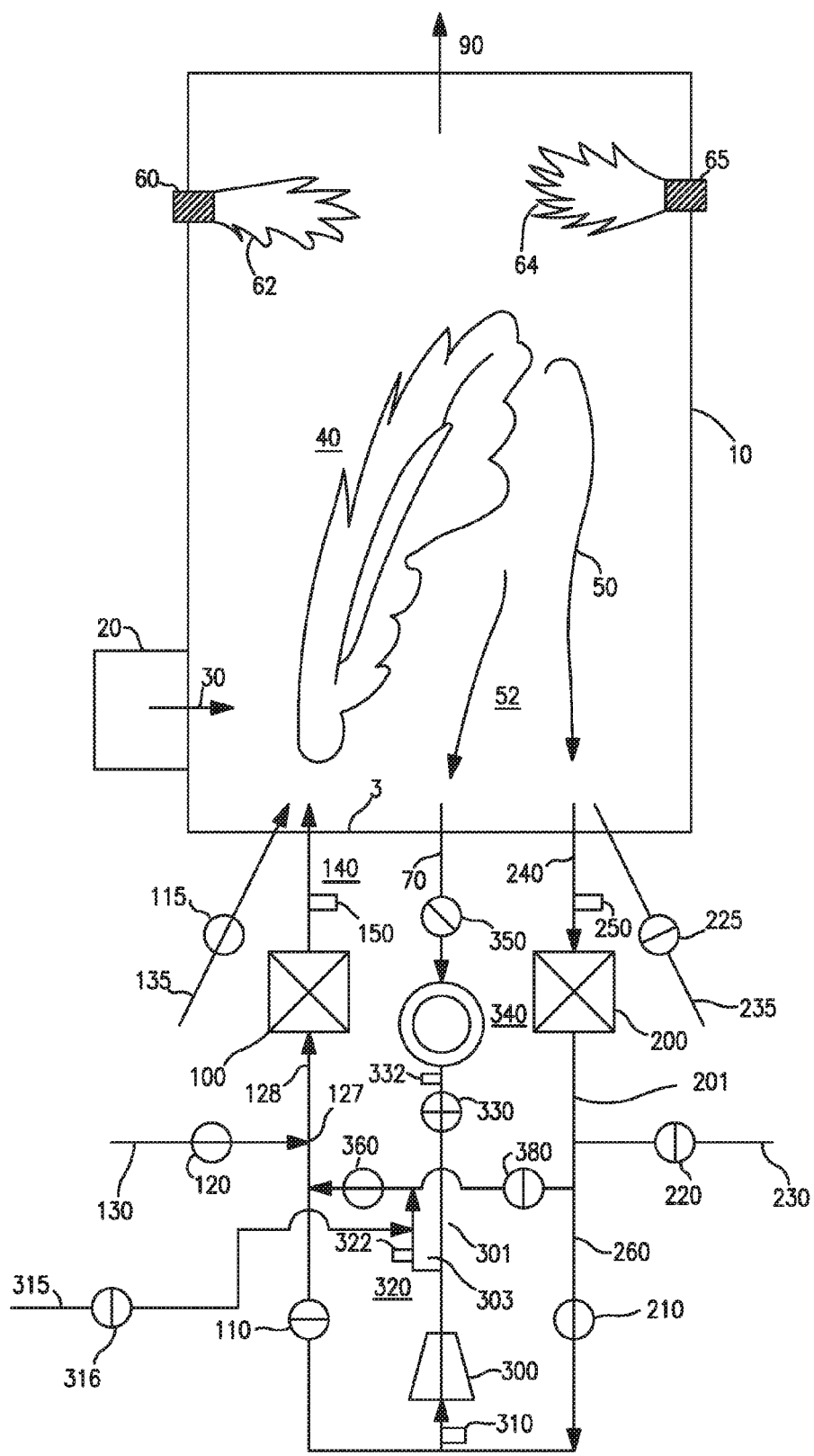
FIGS. 1-3 are schematic representations of different aspects of the process of the present invention.

The present invention employs a heat recovery process which recaptures usable heat from high temperature flue gas exhaust streams. Preferred examples of combustion processes with which the method of this invention can be practiced include glassmelting furnaces, in which glass-forming ingredients are melted together to form molten glass.

This heat recovery process proceeds in two cycles, which are referred to herein as the flue cycle and the reforming cycle. These two cycles are performed alternatingly in two or more checker-filled regenerators. The heat recovery process is preferably carried out in association with furnaces and other combustion devices which employ "oxy-fuel" combustion processes, i.e. combustion of fuel with gaseous oxidant comprising an oxygen content of at least 50 vol. % oxygen, and preferably at least 80 vol. % oxygen, more preferably at least 90 vol. % oxygen, and even at least 99 vol. % oxygen, because the flue gases produced by oxy-fuel combustion have higher $H_2O$ and $CO_2$ concentrations, both of which promote the endothermic reforming reactions that are utilized in the method of this invention. During the flue cycle, the checkers in a first regenerator extract and store heat from a high temperature flue gas which is fed from the furnace into and through this regenerator. Then, in the reforming cycle, from the cooled flue gas that exits the first regenerator, a portion (which is referred to herein as Recycled Flue Gas or RFG) is fed into another (second) regenerator and mixed with a stream of fuel (referred to herein as Reforming Fuel or RF). In the following description, pure methane ($CH_4$) is described as reforming fuel for purposes of illustration. Other satisfactory fuels include any combustible gas, gas mixture, or vaporized liquid fuels including, but not limited to, natural gas, propane, and LPG (liquefied petroleum gas).

As will be described further below, the RFG contains NOx. As another advantage described below, the RFG can be mixed with another gas composition that comprises NOx but that has not been produced in the furnace from which the RFG is obtained.

In the reforming cycle, the RFG/Reforming Fuel mixture enters the second regenerator in which the checker has already been heated, as described herein, and flows through it towards the furnace. The temperature of the RFG/RF mixture passing through the second regenerator continues to increase by extracting heat from the already pre-heated checker. As the RFG/RF mixture passes through the second regenerator, it reaches a temperature at which reforming reactions begin to occur and continue to occur, producing products including $H_2$ and CO. The reforming reactions are endothermic and the heat needed to promote the reforming reactions is absorbed from the heated checker. The gaseous composition that is produced by the reforming reactions typically comprises one or more components such as $H_2$, CO, unreacted gases comprising $H_2O$, $CO_2$, $CH_4$, nitrogen, any residual NOx, and soot. The gaseous composition thus produced may also be called "syngas" herein. The syngas emerges from the second regenerator into the furnace and is combusted in the furnace with oxidant to provide thermal energy for heating and/or melting material in the furnace.

After a length of time, the operation of the two regenerators is reversed, i.e., the regenerator that was used in the flue cycle is switched to the reforming cycle, and the regenerator that was used in the reforming cycle is switched to the flue cycle. After a further period of time, the operation of the two regenerators is reversed again. The timing of the reversals can be determined by elapsed time, or by other criteria such as the temperature of the flue gas exiting from the first regenerator that is in flue cycle. The reversal process is carried out according to a predetermined mechanism and plan, wherein valves are sequenced to open and close based on specific timings.

The operation and control of the present invention is described below in conjunction with FIGS. 1 to 3. An end-port fired glass furnace (10) fitted with two regenerators in end wall (3) is used as an example. However, the operation described herein of a pair of regenerators can be carried out in the same manner when the pair of regenerators are side by side on one side of furnace (10) or are positioned on opposite sides of furnace (10).

As shown in FIG. 1, end-port glass furnace (10) has a feed station (20) where feed material (30) comprising solid glassmaking materials (known as batch and/or cullet) are charged into the furnace to be heated and melted. The flow of molten glass out of furnace (10) is represented as (90). The furnace (10) is equipped with first regenerator (100) on the furnace left side and second regenerator (200) on the furnace right side. Vertical cross-sectional views of the two regenerators are displayed in more detail in FIGS. 2 and 3.

Figure 2:
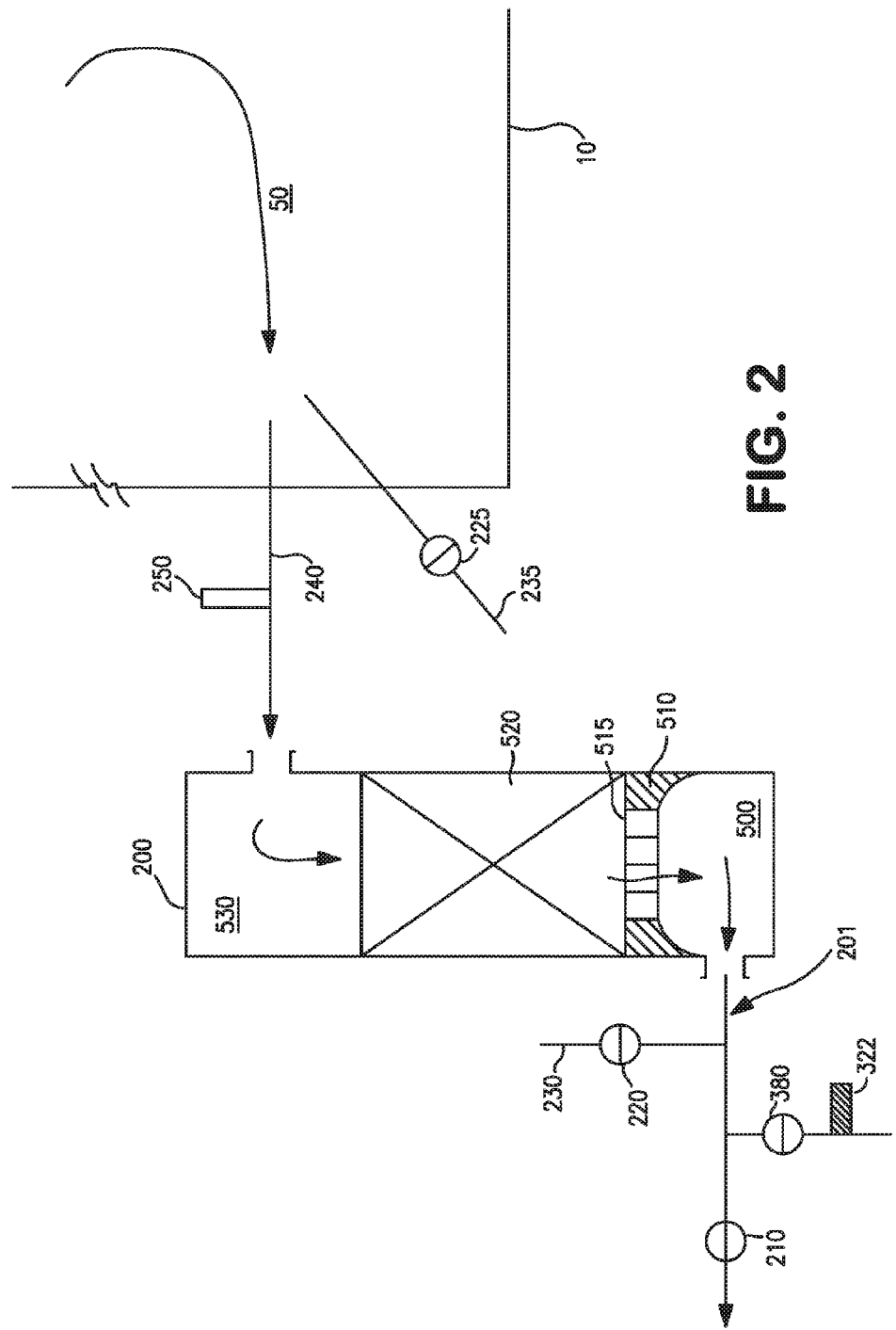

As seen in FIG. 2, regenerator (200) is in the flue cycle wherein flue gas stream (50) from the interior of furnace (10) enters port neck (240) and then flows to the top space (530) of regenerator (200) past an oxygen analyzer (250). The flue gas stream heats checkers (represented as (520)) as it flows through passages between the checkers within regenerator (200), and enters chamber bottom space (500) through gas passages (515) supported on arch (510) which also supports the weight of the whole bed of checkers. As seen in FIG. 1, a portion (52) of the flue gases produced in furnace (10) may be by-passed to conduit (70) (for instance, if it is desired to control the regenerator from becoming too hot) through a partially opened valve (350) then enters stack (340) to exhaust, by which is meant that it does not re-enter the furnace but instead is discharged to the atmosphere and/or conveyed to one or more other stations for storage and/or further treatment or any combination of such destinations. For maximum heat recovery, it is preferred that valve (350) is closed so that essentially all the furnace flue gas goes to regenerator (200) as flue gas stream (50).

As seen in FIGS. 1 and 2, the cooled flue gas stream (201) exits the regenerator (200) in conduit (260), passes through an open valve (210) and oxygen sensor (310), and then enters the suction-side of blower (300). The majority of the flue gas (301) leaving the pressure-side of the blower passes through a damper (330) then a flow meter (332), and finally is directed into stack (340) through which this flue gas leaves the system to exhaust as defined herein. A portion (303) of the flue gas is recycled to the bottom of regenerator (100) by passing through conduit (320) and valve (360). This is Recycled Flue Gas (RFG). Its flow is metered by a flow meter (322). Reforming fuel which is to be fed to the second regenerator (100) is supplied by a conduit (130) through valve (120).

Figure 3:
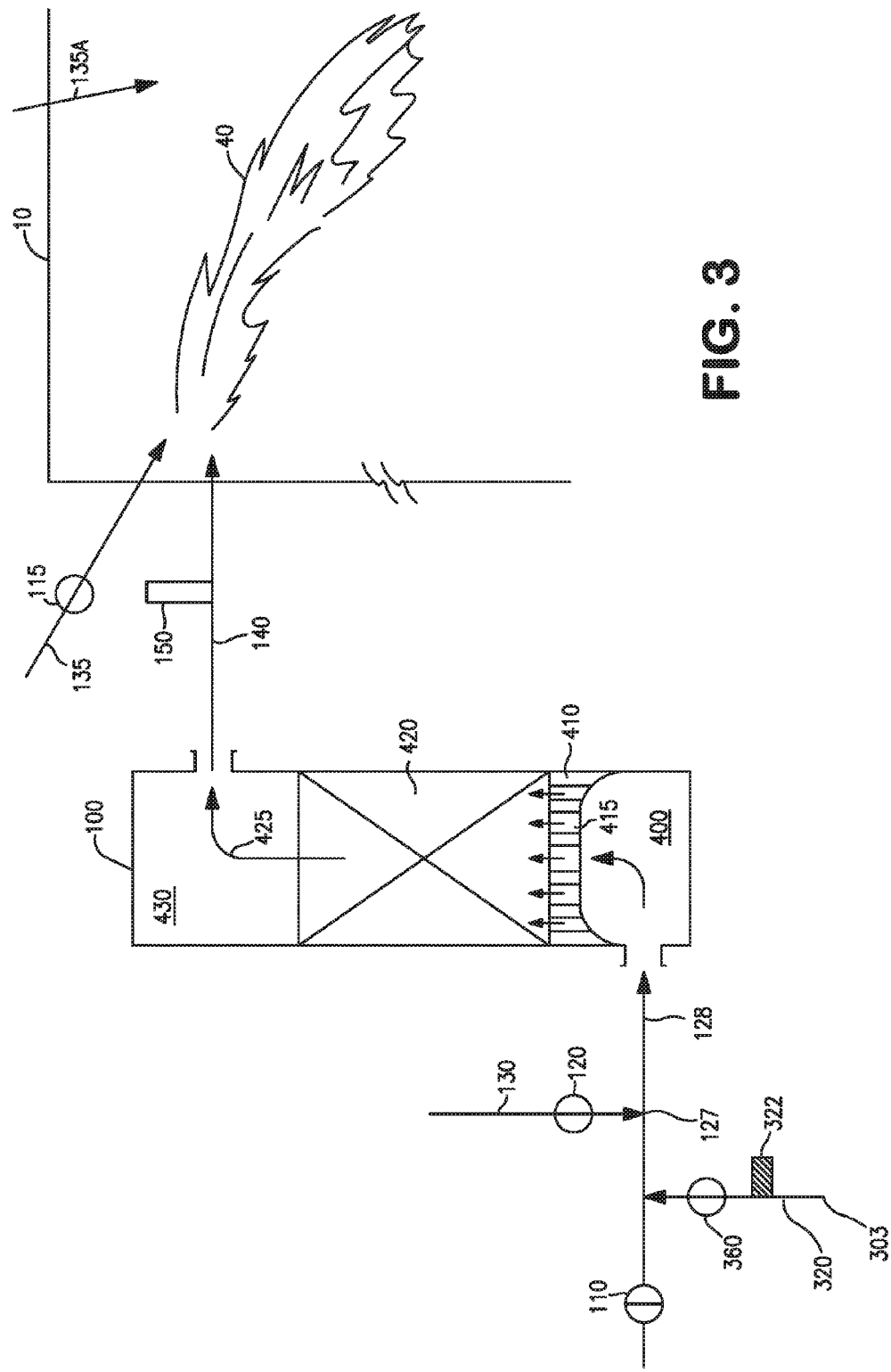

As seen in FIG. 3, the reforming fuel (RF) from stream (130) intersects and mixes with the RFG (303) at location (127) in conduit (128) which also communicates with the bottom space (400) of regenerator (100). This RFG/RF mixture enters the already pre-heated checker pack (420) of regenerator (100) through gas passages (415) on arch (410). Regenerator (100) has already been heated in a previous cycle by passage of flue gas from the furnace into and through the regenerator (100). The temperature of the RFG/RF mixture increases as it flows through the checker pack of regenerator (100). When the temperature of the RFG/RF reaches reforming temperature, endothermic reforming reactions occur in which the reforming fuel (e.g. CH4) reacts with CO2 and H2O in the RFG and forms CO, H2, and some soot. The required heat for the endothermic reforming reactions is taken from the heated checkers. The reforming reaction continues as the RFG/RF mixture continues to travel toward the top space (430). The gaseous stream (425) (referred to herein as a "reformed" or "syngas" gas stream) exits from the top of checker pack (420). Stream (425) has high temperature and includes species such as CO, H2, soot, unreacted CH4, and unreacted CO2 and H2O (as well as nitrogen and any residual NOx as described herein). The syngas stream (425) passes through port neck (140) and oxygen sensor (150), and enters furnace (10). The syngas stream exits checker pack (420) at temperatures for example ranging from 1800 F to 2500 F. This syngas is combusted in the furnace (10) represented as flame (40) to generate additional heat of combustion useful for heating and/or melting material in the furnace, such as glassmaking materials. Oxidant required for combustion of the syngas is supplied by a conduit (135) through opened valve (115). This oxidant can be air, or it can have an oxygen content higher than that of air, i.e. at least 21 vol. %, and preferably equal to or higher than 80 vol. %, more preferably equal to or higher than 90 vol. %, or even at least 99 vol. %.

Typically, the heat recovery process proceeds with one regenerator in the flue cycle and one regenerator in the reforming cycle, as seen in FIG. 1, for about 20 to 40 minutes or until the checkers in the reforming regenerator are too cold to provide sufficient heat to promote the desired endothermic chemical reactions. At that point, and now continuing with the description herein where regenerator (200) was in the flue cycle and regenerator (100) was in the reforming cycle, furnace (10) undergoes reversal in which regenerator (200) is transitioned to the reforming cycle for heat recovery and regenerator (100) is transitioned into the flue cycle for heat accumulation. Before the reversal, remaining syngas in regenerator (100) is to be purged to furnace (10). In this instance, reforming fuel supplied to the regenerator is terminated at first by closing valve (120) while letting the flow of RFG from blower (300) continue. During purging, the RFG flow rate may be increased to shorten the time required for purging to be completed. Remaining syngas in regenerator (100) is purged by the RFG for a specified amount of time so that nearly all the syngas in the regenerator is expelled to the furnace and combusted to completion.

Upon reversal, the flue gas from the furnace passes through regenerator (100), and a portion thereof passes to exhaust (as defined herein) while a portion or the balance is mixed with fuel and the mixture is passed through regenerator (200) and into the furnace. Valve (110) which had been closed is opened, valve (210) is closed, and valve (360) is closed and valve (380) is opened, to permit heated flue gas to pass from regenerator (100) toward and through blower (300), and to permit a portion (303) of this flue gas to pass into regenerator (200) after it is mixed with reforming fuel (230) which enters through valve (220) which had been closed but now is opened. Valve (115) which had been open is closed, and as no combustion aided by oxidant through valve (115) occurs in this phase, and valve (225) is opened. The resulting mixture of reforming fuel and recycled flue gas undergoes in regenerator (200) the endothermic reactions which had occurred in regenerator (100) in the previous cycle as described herein, to produce syngas (425) which passes into furnace (10) where it is combusted with oxidant (235) that is fed through valve (225).

During the heat recovery process, furnace (10) may be co-fired with other burners such as (60) and (65) such that both syngas flame (40) and burner flames (62) and (64) co-exist. In addition, burners (60) and (65) may or may not be firing during the reversal process when the reforming regenerator (100) or (200) as the case may be is undergoing the purging sequence described above. For maximum heat recovery, it is preferred that burners (60) and (65) are not co-firing with the syngas flame (40). It is also preferred that during the purging sequence, burners (60) and (65) are not firing.

In the practice of the present invention, the flue gas that enters the regenerator that is in the flue cycle from the furnace contains NOx. The NOx may have been formed by combustion carried out in the furnace. The portion of this flue gas that is cooled in the regenerator and is then mixed with reforming fuel and recycled to the other regenerator for the reforming reactions contains a portion of the NOx that was in the flue gas which was fed into the first regenerator. The NOx concentration in the flue gas entering the first or second regenerator, as the case may be, is the same as the NOx concentration in the flue gas being recycled, before it is mixed with reforming fuel or any other gas. The total amount of recycled NOx depends on the volume flow rate and the concentration of NOx in the recycled flue gas stream.

The amount of the flue gas emerging through the regenerator in which it was cooled, that is recycled to the other regenerator for reforming, can be adapted to the particular furnace and the particular characteristics such as the NOx content of the flue gas, but it can be said that typically up to about 40% (by volume), and preferably about 6% to 27%, of the flue gas that emerges from the regenerator that is operating in the flue cycle is recycled to be fed into and through the regenerator that is operating in the reforming cycle.

While any ratio of RFG to RF (FG or CH4) in forming the gas stream that is fed into the regenerator that is operating in the reforming cycle can be utilized effectively in the method of this invention, a preferred ratio of RFG to RF (by volume) is 0.5 to 2.0 or even to 3.0.

Referring again to FIGS. 1-3, illustrating the stage in which regenerator (100) is in the reforming cycle, the NOx that is present in the recycled flue gas mixes with the reforming fuel (RF) from conduit (130) and enters checker pack (420) in reforming regenerator (100), and reacts to convert (reduce) NOx to N2. The NOx reduction reactions occur concurrently with the fuel reforming reactions in regenerator (100). More specifically, and without intending to be bound by any particular theory of operation, when the RFG/RF (the preferred RF being CH4) mixture reforms in checker pack (420), syngas stream (425) comprises species such as H2, CO, soot, and unreacted CO2, H2O, CH4, and fuel fragments such as CH, $CH_2$, and $CH_3$. Various degrees of NOx reduction reactions may occur in the reacting RFG/RF mixture starting from the bottom arch (410) of chamber (100) and extending to the port neck (140) entrance to furnace (10). For example, where the flue gas contains soot (i.e. such as particulate carbon), NOx can be reduced to N2 by carbon in soot through reactions such as C+2NO→CO2+N2 (Eq. a). Furthermore, the coexistence of CO and H2 gases generated from the parallel reforming reactions significantly accelerates the effectiveness of the carbon to reduce the recycled NOx to N2. Yet another NOx reduction route, without subscribing to any particular theory or reaction mechanism, is the reaction of NOx with fuel fragments through reactions such as NOx+CH→XN (Eq. b), where XN represents NH3, or HCN, or NO, or a mixture comprising any two or three of the said component species. For example, NOx can be reduced to HCN by CH written as NO+CH→HCN+O (Eq. c). Fuel fragment CH is produced from the reforming fuel (such as CH4) during high temperature reforming and cracking in checker pack (420) of reforming regenerator (100). It is expected that some of the NOx in the RFG stream may be reduced to NH3 or HCN or to a mixture of NH3 and HCN in regenerator (100) while concurrent reforming reactions generate and supply fuel fragments such as CH, CH2, and CH3.

Referring again to FIG. 3, any XN species (i.e., NH3, HCN, and NO) formed in regenerator (100) are present in syngas stream (425) which enters furnace (10) through port neck (140). Oxidant supplied from conduit (135) through opened valve (115) combusts with the syngas and a flame (40) is established. During this syngas combustion, some of the XN species may be oxidized back to NOx and some reduced to N2 within the flame (40). It is preferred to regulate the mixing rate of the syngas with the oxidant in order to control the length of flame (40) and the extent of the XN species conversion back to NOx. For example, oxidant for the syngas combustion may be supplied by multiple lances at different furnace locations such that the syngas combustion is completed by so-called "staged combustion" methods. In staged combustion, the total amount of oxygen that is stoichiometrically required for complete combustion of the combustible material (i.e. fuel and syngas) (or an amount that in the aggregate is less than the total stoichiometric requirement) is supplied in the aggregate from at least two oxidant sources at different furnace locations, represented as 135 and 135A in FIG. 3. Each source supplies less than the total stoichiometrically required amount of oxygen. The supply and the mixing rates of the oxidant with fuel is thus staged and controlled. This method of combustion reduces NOx generation because fuel is not burned under locally high excess O2 conditions which promote NOx formation. In addition, some NOx in furnace flue gases may be entrained into the fuel-rich zone of the flame and reacts with the XN species in the syngas to form N2 preferentially. Furthermore, because the fuel rich syngas (425) enters the furnace at high temperatures (e.g. at least 1800 F, preferably at least 2000 F, up to 2500 F) and the NOx precursors (e.g., HCN, NH3) in the syngas are reduced in a high temperature combustion zone together with the NOx entrained from the furnace flue gases, the present invention is particularly efficient for reducing the entrained furnace NOx to N2, as well as preferentially converting potential NOx precursors such as HCN and NH3 in the syngas to N2 rather than to NOx.

The method of the present invention can also be utilized to convert NOx that is present in another gaseous stream that is not obtained from the furnace. This is shown in FIG. 1, in which stream (315) represents a NOx-containing stream from another source such as another furnace. Stream (315) may also contain one or more of NH3 and/or HCN. Stream (315) is fed to connect with conduit (320) such that stream (315) mixes with RFG when valve (316) is opened. The resulting mixed stream is then mixed with reforming fuel alternately from conduits (130) and (230), to form a mixture that is alternately fed into the heated regenerator (100) and (200) respectively wherein the reforming and NOx reduction reactions occur as described herein.

The method of the present invention provides numerous advantages over other techniques for controlling or reducing NOx in furnace flue gases. That is, no extra equipment is needed for NOx mitigation downstream of the furnace. Also, a higher and more efficient degree of NOx removal is achieved, without imposition of a fuel penalty to accommodate the NOx removal operations. The NOx reduction occurs over a residence time that is relatively much longer than in conventional NOx abatement techniques, thereby affording more reliability and greater tolerance of varying combustion conditions.

The following non-limiting Example 1 illustrates projected NOx reduction levels using the present invention. In Example 1, natural gas (NG) and oxidant are assumed to be pure CH4 and O2, respectively, and CH4 is the reforming fuel. All volume calculations are based on one mole of CH4 as basis in order to simplify the presentations. In addition, furnace flue gas is assumed to be from stoichiometric combustion of CH4 and O2.

EXAMPLE 1

A NOx reduction apparatus and method of the present invention as shown in FIG. 1 is used for this illustration. The projected NOx reduction is summarized in Table 1 below.

Referring also to FIG. 3 and Case 1 of Table 1, one mole of flue gas is recycled through conduit (320) and mixes at location (127) of conduit (128) with one mole of reforming fuel CH4 which is fed in conduit (130) through valve (120). The RFG/NG mole ratio therefore equals one. Assuming complete reforming in checker pack (420) of regenerator (100), four moles of syngas is generated described as CH4+⅓(CO2+2H2O)→4/3CO+8/3H2 (Eq. d). After stoichiometric combustion in flame (40) of the CO and H2 gases which are thus formed with pure O2 supplied from conduit (135), the flue gas mole volume remains at four. Additional gases such as CO2 and H2O from batch/cullet and air infiltration into glass furnace (10) was estimated to be 0.51 moles and 0.45 moles, respectively.

With reference to Case 1 and FIG. 1, the total flue gas volume (50) entering regenerator (200) equals 4.96 moles (i.e., 4+0.51+0.45). Flue gas volume in regenerator (200) remains at 4.96 moles assuming no air ingression into the regenerator. Since only 1 mole of RFG is sent through conduit (320), the recycle ratio was calculated as (1/4.96)× 100=20% for Case 1. Assuming an overall NOx reduction efficiency of 80% for the NOx in the recycled flue gas, the total flue gas NOx reduction entering stack (340) is 0.8× 0.2=0.16, or 16% NOx reduction. If the NOx reduction efficiency is instead 50% as shown in Table 1, then total NOx reduction at the stack is 10%.

Cases 2 and 3 follow similar procedures as those of Case 1, to assess total NOx reduction potentials of the present invention at RFG/NG ratios equal to 1.5 and 2, separately. As seen in Table 1, a higher RFG/NG ratio produces higher total NOx reductions because more flue gas is recycled back to the reforming chamber for NOx reduction. Since the present NOx reduction method occurs in conjunction with the two-regenerator heat recovery process described above, and the preferred RFG/NG ratios for maximum heat recovery may be in the range of 0.5 to 3, the total NOx reduction potential of the present invention as exemplified in FIG. 1 and summarized in Table 1, was projected to be between 10% to 27% if the RFG/NG ratio varies between 1 and 2.

TABLE 1

|  | Case 1 | Case 2 | Case 3 |
| --- | --- | --- | --- |
| Natural gas (NG) flow | 1 | 1 | 1 |
| Recycled flue gas flow (RFG) | 1 | 1.5 | 2 |
| RFG/NG volume ratio | 1 | 1.5 | 2 |
| Syngas volume flow in reforming chamber | 4 | 4.5 | 5 |
| Flue gas volume after syngas combustion | 4 | 4.5 | 5 |
| Batch/Cullet gases | 0.51 | 0.51 | 0.51 |
| Air leakage into furnace | 0.45 | 0.45 | 0.45 |
| Total flue volume exiting furnace | 4.96 | 5.46 | 5.96 |
| Total flue volume in heating chamber | 4.96 | 5.46 | 5.96 |
| RFG recycle ratio (%) | 20 | 27 | 34 |
| NOx reduction efficiency (%) | 80 | 80 | 80 |
| Total NOx reduction (%) | 16 | 22 | 27 |
| NOx reduction efficiency (%) (Alternate) | 50 | 50 | 50 |
| Total NOx reduction (%) (Alternate) | 10 | 14 | 17 |

What is claimed is:

1. A method of carrying out combustion in a furnace, comprising
   (A) combusting fuel in a furnace to produce gaseous combustion products comprising NOx, and
   (B) alternately
   (1) passing gaseous combustion products comprising NOx from the furnace into and through a cooled first regenerator to heat the first regenerator and cool said gaseous combustion products, and passing a first part of said cooled gaseous combustion products from said first regenerator, and fuel, into a heated second regenerator and, in the second regenerator, reacting the gaseous combustion products and the fuel in an endothermic reaction to reduce NOx in said gaseous combustion products to nitrogen and to form syngas comprising hydrogen, CO, and said nitrogen, and passing said syngas from the second regenerator into the furnace and combusting it in the furnace, while passing the remainder of said gaseous combustion products from said first regenerator to exhaust, and
   (2) passing gaseous combustion products comprising NOx from the furnace into and through a cooled second regenerator to heat the second regenerator and cool said gaseous combustion products, and passing a first part of said cooled gaseous combustion products from said second regenerator, and fuel, into a heated first regenerator and, in the first regenerator, reacting the gaseous combustion products and the fuel in an endothermic reaction to reduce NOx in said gaseous combustion products to nitrogen and to form syngas comprising hydrogen, CO, and said nitrogen, and passing said syngas from the first regenerator into the furnace and combusting it in the furnace, while passing the remainder of said gaseous combustion products from said second regenerator to exhaust.

2. A method according to claim 1 wherein said fuel and said syngas are combusted in said furnace with oxidant comprising at least 50 vol. % oxygen.

3. A method according to claim 1 wherein said fuel and said syngas are combusted in said furnace with oxidant comprising at least 90 vol. % oxygen.

4. A method according to claim 1 wherein a gaseous stream that contains NOx and that is not produced in said furnace is passed into the second regenerator with said first part of gaseous combustion products from said first regenerator, and a gaseous stream that contains NOx and that is not produced in said furnace is passed into the first regenerator with said first part of gaseous combustion products from said second regenerator.

5. A method according to claim 4 wherein said fuel and said syngas are combusted in said furnace with oxidant comprising at least 50 vol. % oxygen.

6. A method according to claim 4 wherein said fuel and said syngas are combusted in said furnace with oxidant comprising at least 90 vol. % oxygen.

7. A method of carrying out combustion in a furnace, comprising
   (A) combusting fuel in a furnace to produce gaseous combustion products comprising NOx, and
   (B) alternately
   (1) passing gaseous combustion products comprising NOx from the furnace into and through a cooled first regenerator to heat the first regenerator and cool said gaseous combustion products, and passing a first part of said cooled gaseous combustion products from said first regenerator, and fuel, into a heated second regenerator and, in the second regenerator, reacting the gaseous combustion products and the fuel in an endothermic reaction to reduce NOx in said gaseous combustion products to nitrogen and to form syngas comprising hydrogen, CO, and said nitrogen, and passing said syngas from the second regenerator into the furnace and combusting it by staged combustion in the furnace, while entraining said gaseous combustion products comprising NOx in the furnace into the syngas stream entering the furnace from the second regenerator, and reducing NOx in the syngas stream in a fuel-rich zone of the staged combustion, and
   (2) passing gaseous combustion products comprising NOx from the furnace into and through a cooled second regenerator to heat the second regenerator and cool said gaseous combustion products, and passing a first part of said cooled gaseous combustion products from said second regenerator, and fuel, into a heated first regenerator and, in the first regenerator, reacting the gaseous combustion products and the fuel in an endothermic reaction to reduce NOx in said gaseous combustion products to nitrogen and to form syngas comprising hydrogen, CO, and said nitrogen, and passing said syngas from the first regenerator into the furnace and combusting it by staged combustion in the furnace, while entraining said gaseous combustion products comprising NOx in the furnace into the syngas stream entering the furnace from the first regenerator, and reducing NOx in the syngas stream in a fuel-rich zone of the staged combustion.

8. A method according to claim 7 wherein said fuel and said syngas are combusted in said furnace with oxidant comprising at least 50 vol. % oxygen.

9. A method according to claim 7 wherein said fuel and said syngas are combusted in said furnace with oxidant comprising at least 90 vol. % oxygen.

10. A method according to claim 7 wherein a gaseous stream that contains NOx and that is not produced in said furnace is passed into the second regenerator with said first part of gaseous combustion products from said first regenerator, and a gaseous stream that contains NOx and that is not produced in said furnace is passed into the first regenerator with said first part of gaseous combustion products from said second regenerator.

11. A method according to claim 10 wherein said fuel and said syngas are combusted in said furnace with oxidant comprising at least 50 vol. % oxygen.

12. A method according to claim 10 wherein said fuel and said syngas are combusted in said furnace with oxidant comprising at least 90 vol. % oxygen.

* * * * *